INVENTOR.
JOHN H. SWANBERG
BY
Braddock and Braddock
ATTORNEYS

Oct. 10, 1961     J. H. SWANBERG     3,003,808
SPLIT LEVEL STATION WAGON
Filed June 27, 1960     4 Sheets-Sheet 2

INVENTOR.
JOHN H. SWANBERG
BY Braddock and Braddock
ATTORNEYS

Oct. 10, 1961 J. H. SWANBERG 3,003,808
SPLIT LEVEL STATION WAGON
Filed June 27, 1960 4 Sheets-Sheet 3

INVENTOR.
JOHN H. SWANBERG
BY
Braddock and Braddock
ATTORNEYS

Oct. 10, 1961   J. H. SWANBERG   3,003,808
SPLIT LEVEL STATION WAGON
Filed June 27, 1960   4 Sheets-Sheet 4

INVENTOR.
JOHN H. SWANBERG
BY
Braddock and Braddock
ATTORNEYS 3,003,808
SPLIT LEVEL STATION WAGON
John H. Swanberg, 110 Orlin SE.,
Minneapolis 14, Minn.
Filed June 27, 1960, Ser. No. 38,802
4 Claims. (Cl. 296—24)

The invention herein relates to automobiles and more particularly to a split level station wagon having an easily accessible raised passenger compartment with seats positioned to permit full visibility for the occupants, said seats having back rests that fold level with the seat cushions to form a bed.

Present stations wagons are low and the passengers in the rear seats have a restricted view of the passing scenery and cannot fully enjoy traveling. When on a trip with a full load of people, luggage has to be carried on an exterior top rack, raising the center of gravity, increasing the wind resistance of the station wagon and making it harder to control. In the present invention the passenger visibility is excellent and there is sufficient luggage space within the body of the wagon for all normal needs.

The raised passenger compartment also allows the passengers to assist the driver in surveying traffic ahead to facilitate maneuvering in the city and lessen hazards when passing other autos on the highway. If desired, the passenger compartment can be closed from the driver's seat to eliminate all distractions.

A forward storage compartment under the passenger compartment deck is readily accessible through either or both rear side doors of the station wagon. A rearwardly disposed storage chamber is accessible through the tail gate and a provided trap door in the compartment deck. In addition, small personal articles can be carried in readily accessible storage drawers beneath the rear passenger seats.

It is an object of the invention herein to present a station wagon body that has a comfortable passenger compartment situated to provide improved visibility for the passengers and has a copious amount of segregated storage space with a relatively low center of gravity that is readily accessibly through provided doors.

It is a further object of the invention to provide a vehicle body that has a passenger compartment that can be easily entered without unnatural bending or sliding of the passenger's body.

Figure 1:
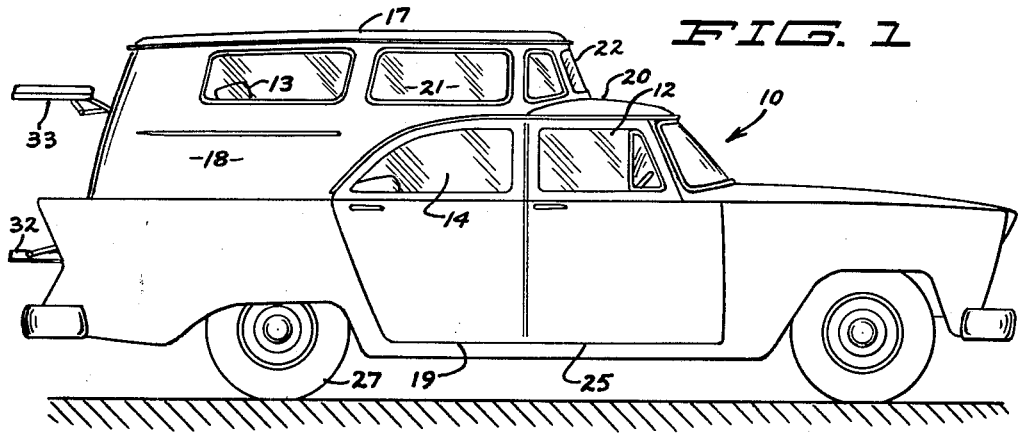
FIG. 1 is a side elevational view of a split level station wagon made according to the present invention.
Figure 2:
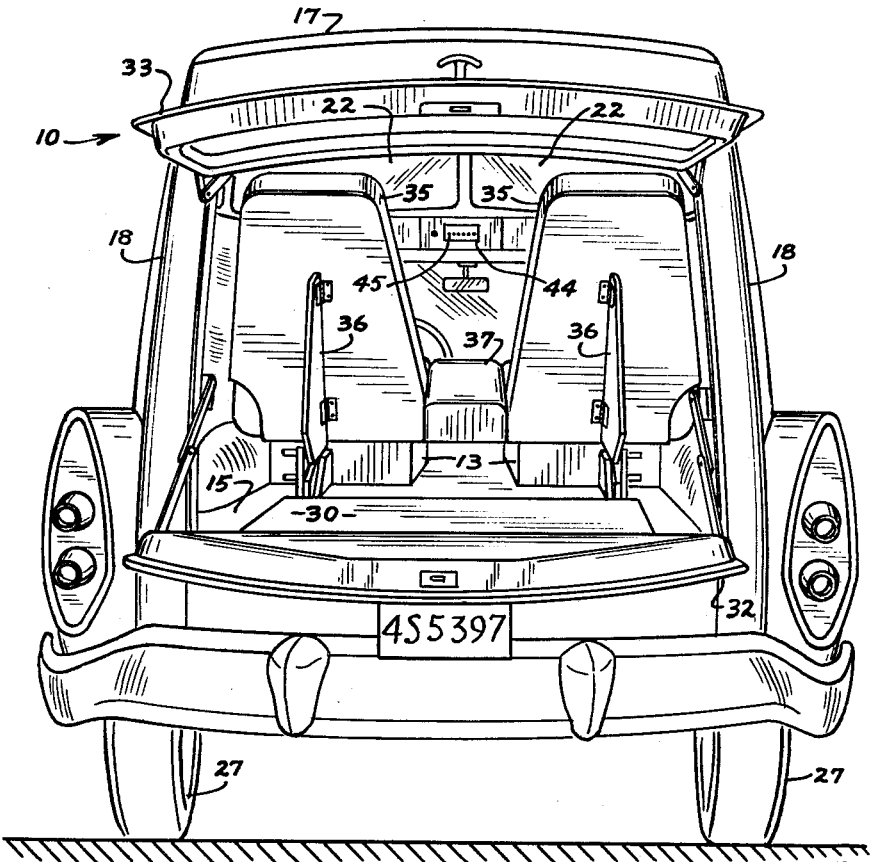
FIG. 2 is an end view of the device of FIG. 1 as viewed from a left end thereof.

Referring to the drawings and the numerals of reference thereon, a split level station wagon 10 includes a forward seat 11 in a driver's compartment 12 and rear passenger seats 13, 13 located on a level above said forward seat and behind said driver's compartment 12 in a passenger compartment 14. Passenger compartment 14 has a deck 15, side walls 18, 18, a forward partition 16 and a first roof 17 that is raised above a second forward roof portion 20 of driver's compartment 12 to provide head room for occupants of the passenger compartment. Side walls 18, 18 have upper observation windows 21, 21 for passengers and each has an access door 19, 19 disposed below the windows on a level with doors 25, 25 of the driver's compartment. Forwardly disposed passenger compartment windshields 22, 22 join first roof portion 17 and second roof portion 20.

Deck 15 of the passenger compartment is spaced from and above a lower floor 23 that extends rearwardly from the driver's compartment and is also spaced above a driveshaft tunnel 24 found in most conventional automobiles. The space between deck 15 and floor 23 is suitable for use for luggage (not shown) or cargo storage. An opening 28 in deck 15 adjacent door 19 provides a convenient entryway for the passenger compartment. A passenger entering the passenger compartment may step onto floor 23 and then to a step like portion 29 of deck 15 to reach one of the seats 13.

A second cargo compartment 26 is located behind the rear wheels 27, 27 and has a removable top access cover 30 which forms a part of deck 15. Said second cargo compartment 26 provides space for a spare tire 31 as well as an ample amount of space for other articles (not shown). A folding tail gate 32 and rear window 33 allow easy access to the second cargo compartment 26 from the rear of the passenger compartment.

Figure 6:
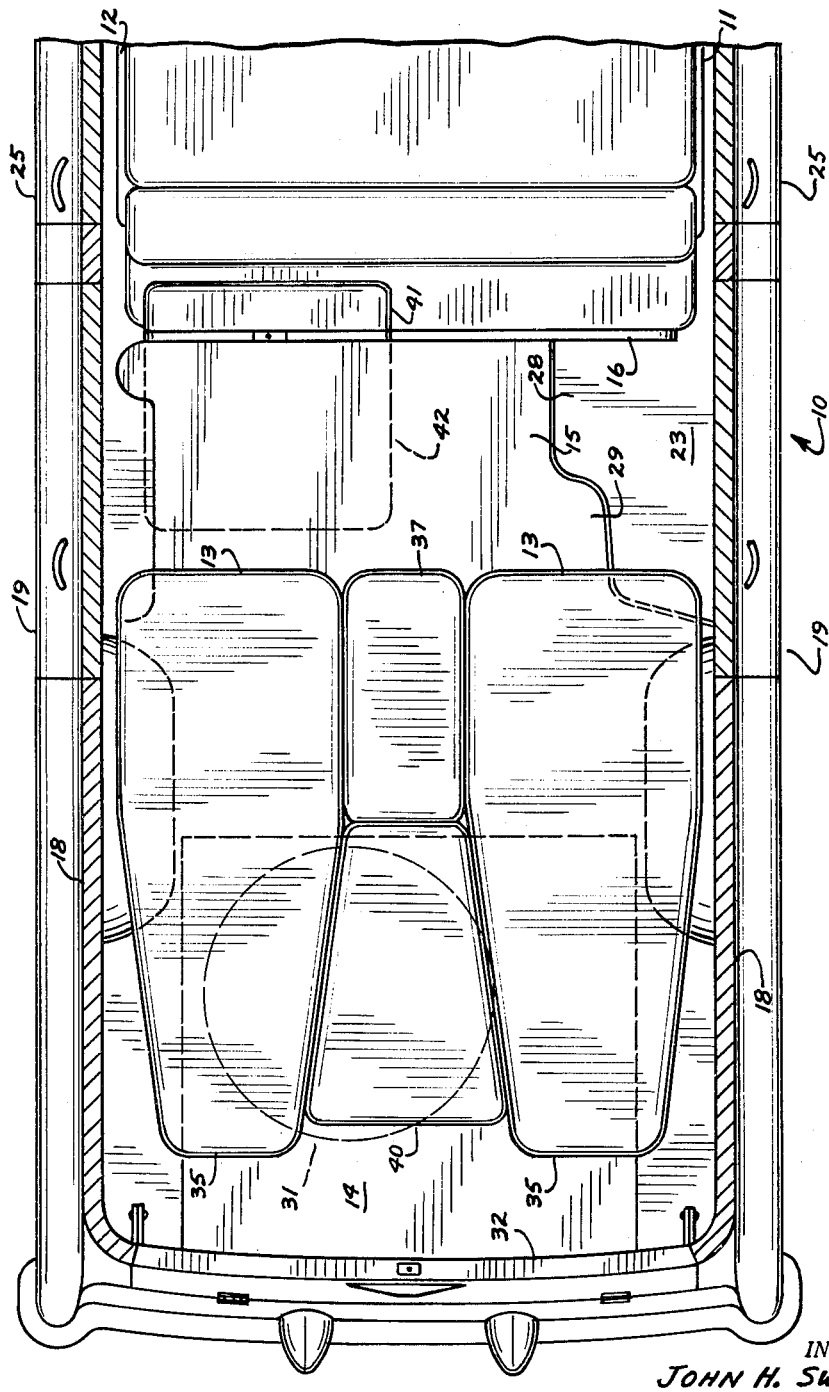
FIG. 6 is a fragmentary top plan view with parts in section and parts broken away of the device of FIG. 1 with the passenger seats shown in position to form a bed.

Passenger seats 13, 13 are fixedly attached to deck 15 and have pivotally mounted back rests 35, 35 with hinged supports 36, 36 that may be moved to allow back rests 35, 35 to pivot rearwardly and form a bed as shown in FIG. 6. A removable center seat cushion 37 and removable back rest 40 may be placed between passenger seats 13, 13 to form a continuous surface for sitting or sleeping.

Figure 3:
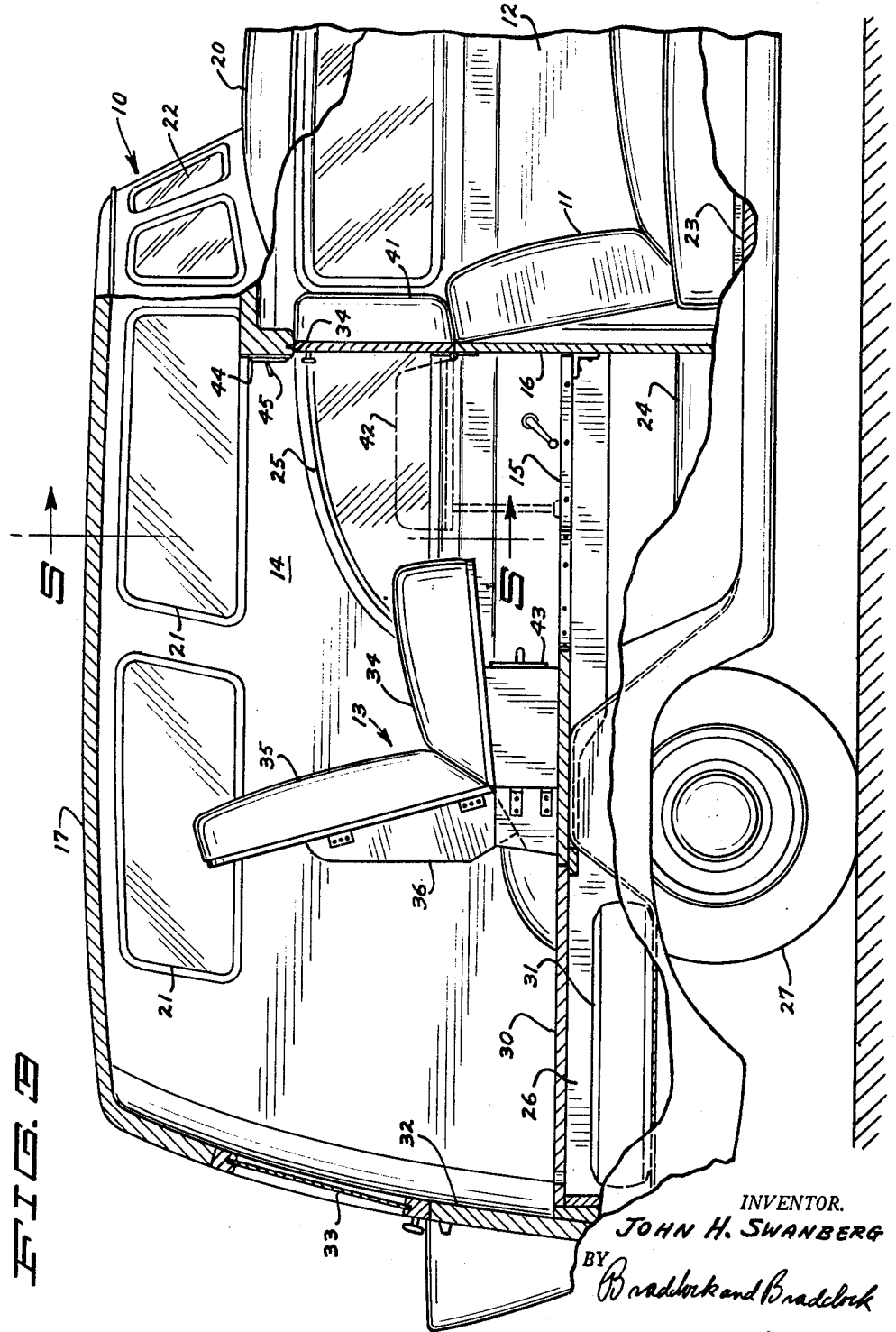
FIG. 3 is an enlarged fragmentary side elevational view of the device of FIG. 1 partially broken away to show the interior thereof.
Figure 4:
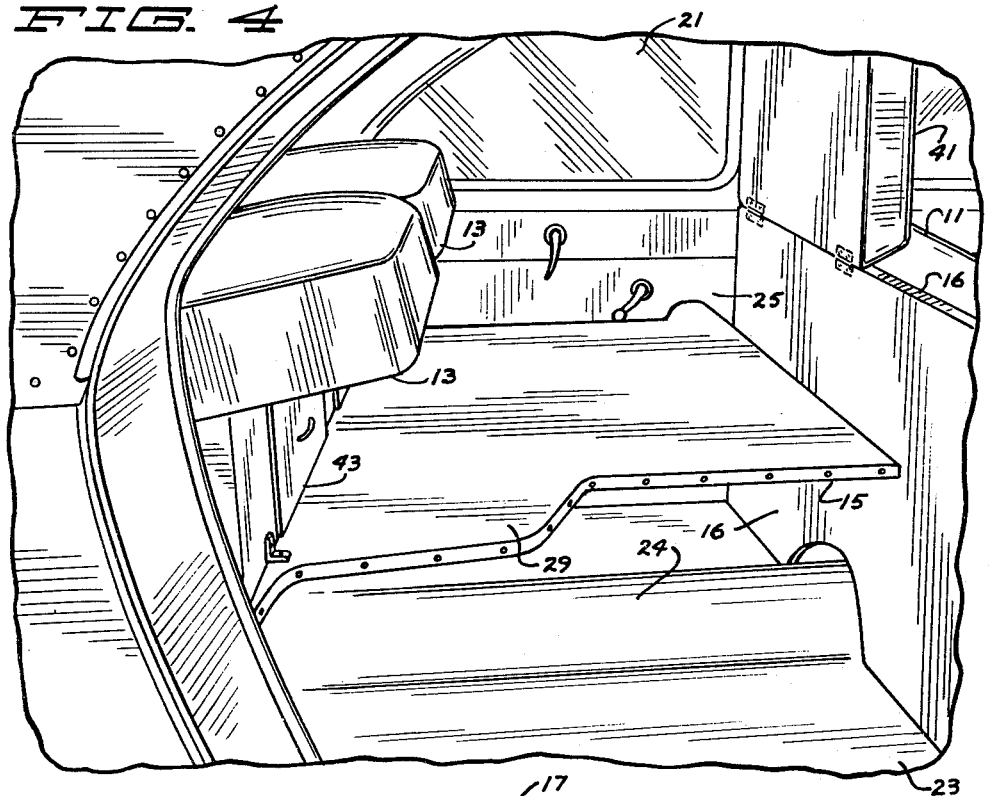
FIG. 4 is a further enlarged fragmentary side elevational view showing a passenger entryway and a storage compartment.
Figure 5:
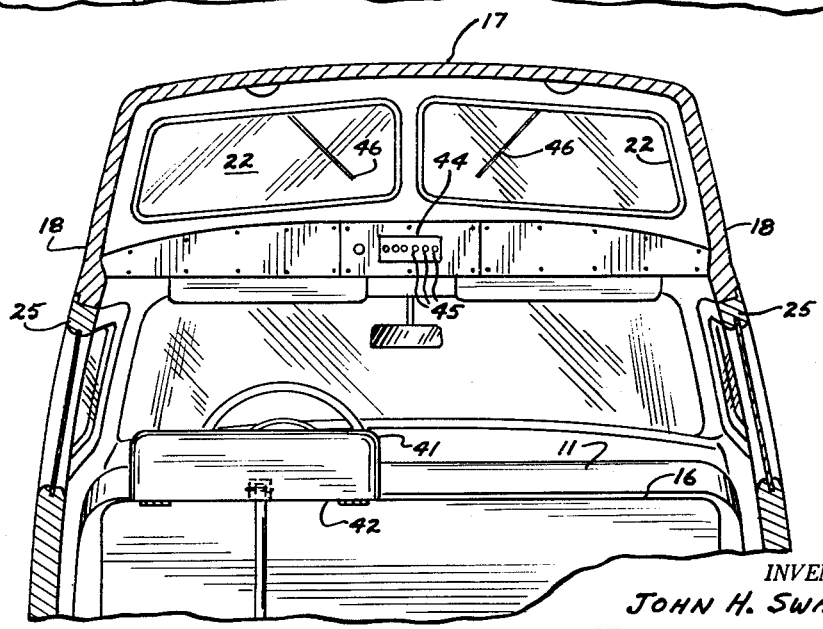
FIG. 5 is a sectional view taken as on line 5—5 in FIG. 3.

An auxiliary cushion 41, pivotally mounted with respect to the forward seat 11, forms an upper portion of front partition 16 and may be folded down to a second position 42 as shown in FIG. 5 and as shown by dotted lines in FIGS. 3 and 6. When folded down in position 42 cushion 41 acts as an extension of the bed formed by the seats and when folded up and latched as at 34 it is used as an additional head rest for a driver, which will insure against neck injuries in case of a rear end collision. While only one cushion 41 is shown a second cushion may be installed on the right hand side of the forward seat.

Passenger seats 13, 13 are raised from deck 15 and have storage drawers 43, 43 underneath them. There also is a third storage area above deck 15 behind the passenger seat 13, 13 and when the back rests 35, 35 are pivoted to form a bed the articles stored in this area may be moved to a fourth storage area ahead of the seats 13 defined by the deck 15, the forward portion of the bottom surface of seat 13 and the bottom surface of cushion 41 when it is in second position 42. The convenient rear tail gate 32 and side doors 19, 19 make transfer of the stored articles relatively easy.

A control panel 44 is disposed ahead of the passenger seats and includes switches 45 for upper windshield wipers 46, 46 and other passenger convenience items (not shown).

It is readily seen that passengers occupying seats 13, 13 have a superior view of the passing scenery and will not distract the driver with conversation. When the seats are made into a bed there is a comfortable place to sleep en route and also overnight without incurring the expense of motel or hotel rooms. Also, as shown, all the cargo may be stored at the bottom of the station wagon making the center of gravity of the vehicle low and adding to its stability and handling characteristics.

What is claimed is:

1. A motor vehicle body including a first forwardly located compartment having a rearwardly extending floor, a first roof portion, first side walls joining said roof and a forward portion of said floor, a front door in each of said first side walls, and a first seat mounted on said floor; a substantially vertical transverse partition attached to said floor behind said first seat; a deck spaced above a rearwardly extending portion of said first compartment floor and attached to said partition; a second roof portion spaced from said deck and situated on a plane above said first roof portion; a windshield connecting said first and said second roof portions; two second sidewalls connecting said floor, said deck and said second roof portion; a rear door on a level with said front doors located in each of said second side walls; a first storage compartment defined by said partition, said deck, and said rear portion of said floor, said storage compartment being accessible through doorways of each of said rear doors; at least one rear seat fixedly attached to said deck; said rear seat having a seat cushion and a generally upright back rest; said back rest being mounted with respect to said seat cushion and being pivotally positionable rearwardly to be substantially level with said seat cushion; and an auxiliary cushion mounted with respect to said first seat movable from a first substantially vertical position to a second position substantially level with said rear seat.

2. The combination as specified in claim 1 wherein at least one openable storage drawer is located underneath said rear seat and above said deck.

3. A motor vehicle body including a first forwardly located compartment having a rearwardly extending floor, a first roof portion, first side walls joining said roof and a forward portion of said floor, a front door in each of said first side walls, and a first seat mounted on said floor; a substantially vertical transverse partition attached to said floor behind said first seat; a deck spaced above a rearwardly extending portion of said first compartment floor and attached to said partition; a second roof portion spaced from said deck and situated on a plane above said first roof portion; a windshield connecting said first and said second roof portions; two second sidewalls connecting said floor, said deck and said second roof portion; a rear door on a level with said front doors located in each of said second side walls; a first storage compartment defined by said partition, said deck, and said rear portion of said floor, said storage compartment being accessible through doorways of each of said rear doors; at least one rear seat fixedly attached to said deck; a portion of said deck adjacent a rear door being cut away to uncover a section of said first compartment floor; said section constituting a first step; and said deck adjacent said door constituting a second step to provide access to said rear seat.

4. A motor vehicle body including a first forwardly located compartment having a rearwardly extending floor, a first roof portion, first side walls joining said roof and a forward portion of said floor, a front door in each of said side walls, and a first seat mounted on said floor; a substantially vertical transverse partition attached to said floor behind said first seat; an auxiliary cushion pivotally mounted with respect to said first seat forming an upper portion of said partition; a deck spaced from a rearwardly extending portion of said first compartment floor and attached to said partition; a second roof portion spaced from said deck and situated on a plane above said first roof portion; a windshield connecting said first and said second roof portions; two second side walls connecting said rearwardly extending portion of said first compartment floor, said deck, and said second roof portion; a rear door located in each of said second side walls on a level with said front doors; a first storage compartment defined by said partition, said deck, and said rearwardly extending portion of said floor, said storage compartment being accessible through each of said rear doors; at least one seat cushion fixedly attached to said deck; a generally upright back rest mounted with respect to said seat cushion and being pivotally positionable rearwardly to a level with said seat cushion, and said auxiliary cushion pivotally mounted with respect to said first seat being pivotally positionable rearwardly to a level with said seat cushion, said back rest and said cushions thereby forming a bed; a second storage area defined by an under surface of said seat, an under surface of said rearwardly positioned auxiliary cushion and said deck, that is at least equal in volume to that occupied by said rearwardly positioned back rest; and a passenger step area provided on said deck adjacent one of said rear doors.

References Cited in the file of this patent

UNITED STATES PATENTS

| | | |
|---|---|---|
| 1,596,212 | Newell et al. | Aug. 17, 1926 |
| 1,868,093 | Clapp | July 19, 1932 |
| 1,902,607 | Austin | Mar. 21, 1933 |
| 2,662,793 | Lindsay | Dec. 15, 1953 |
| 2,859,797 | Mitchelson | Nov. 11, 1958 |